United States Patent
Gabrielson et al.

(10) Patent No.: US 9,199,884 B2
(45) Date of Patent: Dec. 1, 2015

(54) LIQUID COMPOSITIONS CONTAINING UREASE INHIBITORS AND GLYCOL ALKYL ETHERS AND METHODS OF MAKING A USE THEREOF

(71) Applicant: Koch Agronomic Services, LLC, Wichita, KS (US)

(72) Inventors: Kurt D Gabrielson, Lilburn, GA (US); Stacey L. Wertz, Conyers, GA (US); Pablo G Dopico, Conyers, GA (US); Drew R Bobeck, Doraville, GA (US)

(73) Assignee: Koch Agronomic Services, LLC, Wichita ( * ) Notice: Subject to any disclaimer, the term of this patent is extended or adjusted under 35 U.S.C. 154(b) by 0 days.

(21) Appl. No.: 13/968,324

(22) Filed: Aug. 15, 2013

(65) Prior Publication Data

US 2014/0047883 A1    Feb. 20, 2014

Related U.S. Application Data

(60) Provisional application No. 61/683,343, filed on Aug. 15, 2012.

(51) Int. Cl.
| | |
|---|---|
| *C05C 9/00* | (2006.01) |
| *C05C 9/02* | (2006.01) |
| *C05G 3/08* | (2006.01) |
| *C09K 15/06* | (2006.01) |
| *C05G 3/00* | (2006.01) |
| *C09K 15/26* | (2006.01) |

(52) U.S. Cl.
CPC ... *C05G 3/00* (2013.01); *C05C 9/00* (2013.01); *C05C 9/02* (2013.01); *C05G 3/08* (2013.01); *C09K 15/06* (2013.01); *C09K 15/26* (2013.01)

(58) Field of Classification Search
USPC ............... 71/28–30, 64.1; 252/407
See application file for complete search history.

(56) References Cited

U.S. PATENT DOCUMENTS

| | | |
|---|---|---|
| 3,462,256 A | 8/1969 | Justice |
| 3,576,613 A | 4/1971 | Fleming |
| 4,089,899 A | 5/1978 | Greidinger et al. |
| 4,240,923 A | 12/1980 | Sartori et al. |
| 4,517,003 A | 5/1985 | Kolc et al. |
| 4,518,413 A | 5/1985 | Swerdloff et al. |
| 4,528,020 A | 7/1985 | Kolc et al. |
| 4,530,714 A | 7/1985 | Kolc et al. |
| 4,540,428 A | 9/1985 | Van Der Puy et al. |
| 4,676,822 A | 6/1987 | Gautney |
| 4,740,233 A | 4/1988 | Kleschick et al. |
| 4,746,349 A | 5/1988 | Becker |
| 5,071,463 A | 12/1991 | Narayanan et al. |
| 5,160,528 A | 11/1992 | Chaudhuri et al. |
| 5,188,654 A | 2/1993 | Manalastas et al. |
| 5,256,181 A | 10/1993 | Manalastas et al. |
| 5,352,265 A | 10/1994 | Weston et al. |
| 5,364,438 A | 11/1994 | Weston et al. |
| 5,435,821 A * | 7/1995 | Duvdevani et al. ............. 71/28 |
| 5,698,003 A | 12/1997 | Omilinsky |
| 6,217,630 B1 | 4/2001 | Chanen et al. |
| 8,048,189 B2 | 11/2011 | Whitehurst |
| 8,075,659 B2 | 12/2011 | Wissemeier |
| 8,088,950 B2 | 1/2012 | Bock |
| 2005/0192319 A1 | 9/2005 | Boeckh et al. |
| 2007/0157689 A1 | 7/2007 | Sutton |
| 2008/0176745 A1* | 7/2008 | Wilson et al. ................ 504/101 |
| 2008/0287709 A1 | 11/2008 | Huttenloch |
| 2009/0035384 A1 | 2/2009 | Lambeth |
| 2009/0227458 A1* | 9/2009 | Boucher et al. ............... 504/244 |
| 2010/0009890 A1 | 1/2010 | Barnabas et al. |
| 2010/0168256 A1 | 7/2010 | Rittig |
| 2010/0206031 A1 | 8/2010 | Whitehurst |
| 2010/0215611 A1 | 8/2010 | Rittig |
| 2011/0113842 A1 | 5/2011 | Urrutia |
| 2011/0154874 A1* | 6/2011 | Rahn et al. ........................ 71/21 |
| 2011/0196172 A1 | 8/2011 | Kysilka |
| 2011/0233474 A1* | 9/2011 | Cigler ...................... 252/400.21 |
| 2011/0259068 A1 | 10/2011 | Whitehurst |
| 2013/0152649 A1 | 6/2013 | Kweeder et al. |
| 2013/0157850 A1* | 6/2013 | Wilson et al. ................ 504/101 |
| 2013/0259582 A1 | 10/2013 | Birthisel et al. |
| 2013/0283873 A1* | 10/2013 | Sutton et al. ..................... 71/29 |
| 2014/0037570 A1* | 2/2014 | Whitehurst et al. ......... 424/76.6 |

FOREIGN PATENT DOCUMENTS

| | | |
|---|---|---|
| CA | 2701995 A1 | 10/2011 |
| JP | 55-16026 | 2/1980 |

(Continued)

OTHER PUBLICATIONS

Adachi, A. et al., "Anaphylaxis to polyvinylpyrrolidone after vaginal application of povidone-iodine," *Contact Dermatitis*, 2003, 48(3):133-136.

Reisch, Marc, "Solvent Users Look to Replace NMP," *Chemical & Engineering News*, 2008, 86(29), p. 32.

Rönnau, A.C. et al., "Anaphylaxis to polyvinylpyrrolidone in an analgesic preparation," *British Journal of Dermatology*, 2000, 143:1055-1058.

(Continued)

*Primary Examiner* — Wayne Langel

(57) ABSTRACT

The present invention provides improved solvent systems for the preparation of liquid formulations of urease or nitrification inhibitors, specifically NBPT, comprising alkylene glycol alkyl ethers. The solvent systems provided good solubility of the urease inhibitor as well as at least one of improved stability, lower flammability, lower toxicity, improved cold temperature storage, improved handling, improved adsorption onto and/or solubility with solid media such as UFP or urea. Methods of making and using the compositions are also provided.

31 Claims, No Drawings

(56) References Cited

FOREIGN PATENT DOCUMENTS

| JP | 2011-162425 | * | 8/2011 |
| WO | 92/17422 A1 | | 10/1992 |
| WO | 97/22568 A1 | | 6/1997 |
| WO | 2008/000196 | * | 1/2008 |
| WO | 2008000196 | | 1/2008 |
| WO | WO 2008/000196 A1 | | 1/2008 |
| WO | 2010/072184 A2 | | 7/2010 |
| WO | 2011/137393 A1 | | 11/2011 |
| WO | 2013/090287 A1 | | 6/2013 |

OTHER PUBLICATIONS

Yoshida et al., "Anaphylaxis to Polyvinylpyrrolidone in Povidone-Iodine for Impetigo Contagiosum in a Boy with Atopic Dermatitis," *International Archives of Allergy and Immunology*, 2008, 146(2):169-173.

International Patent Application No. PCT/US2013/055193, "International Search Report and Written Opinion Received", Jan. 14, 2014, 23 pages.

* cited by examiner

LIQUID COMPOSITIONS CONTAINING UREASE INHIBITORS AND GLYCOL ALKYL ETHERS AND METHODS OF MAKING A USE THEREOF

CROSS-REFERENCE TO RELATED APPLICATION

This application claims priority under 35 U.S.C. §119(e) from U.S. Provisional Application 61/683,343, filed Aug. 15, 2012, which is incorporated by reference in its entirety herewith.

BACKGROUND OF THE INVENTION

Granular fertilizers have been used for some time to provide nitrogen to the soil. The most widely used and agriculturally important nitrogen fertilizer is urea. Most of the urea currently produced is used as a fertilizer in its granular (or prilled) form. However, after its application to soil, its hydrolysis to yield ammonia and carbon dioxide occurs. This process is catalyzed by the enzyme urease, which is produced by some bacteria and fungi. The gaseous products formed by the hydrolysis reaction (ammonia and carbon dioxide) volatilize to the atmosphere and thus, substantial losses from the total amount of the nitrogen applied to the field occur. The hydrolysis process can be considerably decelerated by urease inhibitors that are applied together with urea. Urease inhibitors can also be used in combination with nitrification inhibitors. Nitrification inhibitors are compounds which inhibit the conversion of ammonium to nitrate and reduce nitrogen losses in the soil. Examples of nitrification inhibitors include, dicyandiamide (DCD).

Examples of urease inhibitors are the thiophosphoric triamide compounds disclosed in the U.S. Pat. No. 4,530,714, including N-(n-butyl) thiophosphoric triamide (NBPT), the most developed representative of this class of chemicals. When incorporated into a urea-containing fertilizer, NBPT reduces the rate at which urea is hydrolyzed in the soil to ammonia. The benefits realized as a result of the delayed urea hydrolysis include the following: (1) nutrient nitrogen is available to the plant over a longer period of time; (2) excessive build-up of ammonia in the soil following the application of the urea-containing fertilizer is avoided; (3) the potential for nitrogen loss through ammonia volatilization is reduced; (4) the potential for damage by high levels of ammonia to seedlings and young plants is reduced; (5) plant uptake of nitrogen is increased; and (6) an increase in crop yields is attained. The use of NBPT is commercially available for the use in agriculture and marketed in such products as the AGROTAIN® nitrogen stabilizer product line.

Industrial grade N-(n-butyl) thiophosphoric triamide (NBPT) is a solid, waxy compound, and decomposes by the action of water, acid and/or elevated temperature. Accordingly, its combination with other solid materials is very difficult. The use of a liquid formulation of the NBPT is highly desirable because it greatly facilitates the introduction of the NBPT onto other solid materials, such as the PERGOPAK® M used in AGROTAIN DRY® and formulation with granular urea. The impregnation of NBPT onto a UFP, such as PERGOPAK® M or other solids, such as granular urea requires the NBPT to be introduced into some liquid carrier prior to being mixed with, the solid. The dissolution of NBPT with or without UFP into liquid urea-containing fertilizers, such as, urea-ammonium nitrate solutions (UAN), is also facilitated by having the NBPT in an easily assimilated liquid formulation.

However NBPT is very difficult to solubilize in a concentrated solution. Accordingly, a variety of solvent mixtures have been tried, including those disclosed in U.S. Pat. Nos. 5,352,265 and 5,364,438 (using N-methyl pyrrolidone, NMP); U.S. Pat. No. 5,698,003 (using propylene glycol or dipropylene glycol alone or in combination with NMP or poly(oxy-1,2-ethanediyl)-alpha (nonylphenyl)omega-hydroxy); and U.S. Pat. No. 8,048,189 (using ethanolamine, diethanolamine, triethanolamine, monoisopropanolamine, or diisopropanolamine buffered with acetic acid); PCT Patent Publication WO 2008/000196 (using dipropyleneglycol monomethylether, diethyleneglycol monomethylether, triethyleneglycol monomethylether or diethyleneglycol monobutylether in combination with polyvinylpyrrolidone (PVP) or NMP); CA Patent publication 2701995 (using water); U.S. Patent Publication Nos. 2010/0168256 (using water); 2010/0206031 and 2011/0259068 (using glycerol, aqueous sorbitol, ethanolamine, diethanolamine or triethanolamine); 2011/0113842 (using garlic essential oil in combination with sodium hydroxide or triethanolamine); and 2011/0233474 (using (S)-ethyl lactate or propylene carbonate in combination with tetrahydrofurfuryl alcohol, PVP, NMP, glycerol formal, propylene glycol and/or water).

However, both urea and solvents containing hydroxyl groups are hydroscopic which causes problems with NBPT formulations, especially with urea. Water can facilitate the decomposition of N-(n-butyl) thiophosphoric triamide (NBPT) into non-effective substances. In addition, water causes stickiness, clumping and caking of urea-based, granular fertilizers which reduces the flowability of urea-based granular fertilizers, and the like and complicates their handling. These problems are exacerbated during storage of these materials.

Accordingly, at least 10 wt. % of NMP or 0.1% of PVP is often used either as a co-solvent or as a crystallization inhibitor. However, amides like NMP and PVP can be health deleterious. N-methylpyrrolidone is often classified among teratogenic compounds and accordingly manufacturers must consider alternative solvents, especially where worker exposure is difficult to control (see e.g. *Chemical & Engineering News:* 32 (Jul. 21, 2008)). In addition, PVP has been documented to cause allergic reactions, particularly when applied to the skin or where it has come into contact with mucous membranes (see e.g. K. Yoshida et al. (2008) International Archives of Allergy and Immunology 146 (2): 169-73 (2008); A. Adachi et al. *Contact Dermatitis* 48 (3): 133-6 (2003); A. C. Rönnau et al. *The British Journal of Dermatology* 143 (5): 1055-8 (2000)).

The above mentioned disadvantages are overcome by the compositions of the present invention which provide compositions with reduced health risk and/or toxicity, lower volatility and flammability, increased stability of NBPT and other components in the composition, the ability to be used as lower application temperatures, and/or using commercially available, low cost materials.

The present invention relates to a composition comprising a urease inhibitor and an alkylene glycol alkyl ether solvent. The present invention also relates to methods of making the compositions and their use in agricultural applications.

DETAILED DESCRIPTION OF THE INVENTION

As used herein, the below terms have the following meanings unless specified otherwise:

1. Abbreviations and Definitions

It is noted here that as used in this specification and the appended claims, the singular forms "a," "an," and "the" include plural reference unless the context clearly dictates otherwise.

All percentages, parts and ratios are based upon the total weight of the compositions of the present invention, unless otherwise specified. All such weights as they pertain to listed ingredients are based on the active level and, therefore do not include solvents or by-products that may be included in commercially available materials, unless otherwise specified. The term "weight percent" may be denoted as "wt. %" herein. All molecular weights as used herein are weight average molecular weights expressed as grams/mole, unless otherwise specified.

"Alkyl," by itself or as part of another substituent, means, unless otherwise stated, a straight or branched chain, fully saturated aliphatic hydrocarbon radical having the number of carbon atoms designated. For example, "$C_{1-8}$alkyl" refers to a hydrocarbon radical straight or branched, containing from 1 to 8 carbon atoms that is derived by the removal of one hydrogen atom from a single carbon atom of a parent alkane. The phrase "unsubstituted alkyl" refers to alkyl groups that do not contain groups other than fully saturated aliphatic hydrocarbon radicals. Thus the phrase includes straight chain alkyl groups such as methyl, ethyl, propyl, butyl, pentyl, hexyl, heptyl, octyl, nonyl, decyl, undecyl, dodecyl and the like. The phrase also includes branched chain isomers of straight chain alkyl groups such as isopropyl, t-butyl isobutyl sec-butyl, and the like. Representative alkyl groups include straight and branched chain alkyl groups having 1, 2, 3, 4, 5, 6, 8, 9, 10, 11 or 12 carbon atoms. Further representative alkyl groups include straight and branched chain alkyl groups having 1, 2, 3, 4, 5, 6, 7 or 8 carbon atoms.

"Alkylene" by itself or as part of another substituent means a divalent radical derived from an alkane, as exemplified by —$CH_2CH_2CH_2CH_2$—. Typically, an alkylene group will have from 1, 2, 3, 4, 5, 6, 7 or 8 carbon, atoms that is derived by me removal of one hydrogen atom from a single carbon atom of a parent alkyl.

As noted above, the present invention provides an improved formulation for urease inhibitors, for example N-(alkyl) thiophosphoric triamide urease inhibitors as described in U.S. Pat. No. 4,530,714, that are useful in agricultural applications. The present invention also includes thiophosphoric triamides and phosphoric triamides of the general formula (I)

$$X=P(NH_2)_2NR^1R^2 \quad (1)$$

where X=oxygen or sulfur, and $R^1$ and $R^2$ are independently selected from hydrogen, $C_1$-$C_{12}$ alkyl, $C_3$-$C_{12}$ cycloalkyl, $C_6$-$C_{14}$ aryl, $C_2$-$C_{12}$ alkenyl, $C_2$-$C_{12}$ alkynyl, $C_5$-$C_{14}$ heteroaryl, $C_1$-$C_{14}$ heteroalkyl, $C_2$-$C_{14}$ heteroalkenyl, $C_2$-$C_{14}$ heteroalkynyl, or $C_3$-$C_{12}$ cycloheteroalkyl groups.

It should be understood that the term N-(alkyl) thiophosphoric triamide as used throughout this application refers not only to the N-(alkyl) thiophosphoric triamide in its pure form, but also to commercial grades of the material which can contain up to 50 percent (or less), preferably not more than 20 percent, of impurities, depending on the method of synthesis and purification scheme(s), if any, employed in the production.

In one embodiment, the formulation comprises at least one alkylene glycol alkyl ether. Examples of alkylene glycol alkyl ethers include, but are not limited to, diethylene glycol monoethyl ether, diethylene glycol monopropyl ether, diethylene glycol monopentylyl ether, diethylene glycol monoisopropyl ether, diethylene glycol monoisobutyl ether, diethylene glycol monohexyl ether, triethylene glycol monomethyl ether. Methylene glycol monopropyl ether, triethylene glycol monobuyl ether, triethylene glycol monopentyl ether, triethylene glycol monoisopropyl ether, triethylene glycol monoisobutyl ether, triethylene glycol monohexyl ether, tetraethylene glycol monoraethyl ether, tetraethylene glycol monoethyl ether, tetraethylene glycol monopropyl ether, tetraethylene glycol monobutyl ether, tetraethylene glycol monopentyl ether, tetraethylene glycol monoisopropyl ether, tetraethylene glycol monoisobutyl ether, tetraethylene glycol monohexyl ether, dipropylene glycol monoethyl ether, dipropylene glycol monopropyl ether, dipropylene glycol monobutyl ether, dipropylene glycol monopentyl ether, dipropylene glycol monoisopropyl ether, dipropylene glycol monoisobutyl ether, dipropylene glycol monohexyl ether, tripropylene glycol monomethyl ether (MTPGE), tripropylene glycol monoethyl ether, tripropylene glycol monopropyl ether, tripropylene glycol monobutyl ether, tripropylene glycol monopentyl ether, tripropylene glycol monoisopropyl ether, tripropylene glycol monoisobutyl ether, tripropylene glycol monohexyl ether, triethylene glycol monobutyl ether (MTRGE), tetraethylene glycol monobuyl ether (MTEGE), diethylene glycol monobutyl ether (MDGE), and dipropylene glycol dimethyl ether (MDPG). In another aspect, the composition does not include PVP or NMP. In another aspect, the present invention provides an improved solvent system that includes at least two types of alkylene glycol alkyl ethers. Examples of commercially available alkylene glycol alkyl ethers include but are not limited to FLOMIN F672®, (a blend of ca. MW 250, methyl glycol ethers), FLOMIN F660® (a blend of triethylene glycol monobutyl ether 70-80%, tetraethylene glycol monobutyl ether 15-25%, diethylene glycol monobutyl ether <5%) and FLOMIN F661® (a mixture of triethylene glycol monoethyl ether and triethylene glycol monobutyl ether).

In one aspect, the composition of the present invention contains 1 wt. % to about 80 wt. % of the phosphoric or thiophosphoric triamide. In another aspect, the composition of the present invention contains 10 to 75 wt. % of the phosphoric or thiophosphoric triamide. In another aspect, the composition of the present invention contains 20 to 70 wt. % of the phosphoric or thiophosphoric triamide. In another aspect, the composition of the present invention contains 30 to 50% w/w of the phosphoric or thiophosphoric triamide. In one aspect, the phosphoric or thiophosphoric triamide is N-(n-butyl) thiophosphoric triamide.

Optionally, the formulation can also contain additional components, including co-solvents. In one embodiment, the additional co-solvent is a glycol or glycol derivative. Examples of glycols can be represented by the general formula $C_nH_{2n}(OH)_2$, where n is 2 to 12. In some embodiments, n is 3. Glycols also include aliphatic dihydroxy (dihydric) alcohols. Examples of glycols (diols) are ethylene glycol (glycol), propylene glycol (1,2-propanediol), 1,4-butanediol, 1,5-pentanediol, 1,6-hexanediol, 1,10-decanediol, 1,7-heptanediol, 1,9-nonanediol, 1,8-octanediol, 1,3-propanediol, 1,3-butanediol, 1,4-butanediol, 2,3-butanediol, 2,4-pentanediol, 2,5-hexanediol, 4,5-octanediol and 3,4-hexanediol. Examples of other noncyclic glycols (diols) are neopenty glycol, pinacol 2,2-diethyl-1,3-propanediol, 2-ethyl-1,3-hexanediol, 2-ethyl-2-butyl-1,3-propanediol, isobutylene glycol, 2,3-dimethyl-1,3-propanediol, 1,3-diphenyl-1,3-propanediol, 3-methyl-1,3-butanediol. Examples of cyclic glycols are 1,4-cyclohexanedimethanol and p-xylylene glycol. Examples of polyglycols are polyethylene glycols and polypropylene glycols.

Examples of glycol (diol) derivatives which are esters are ethylene glycol monostearate, ethylene glycol distearate, ethylene glycol amido stearate, propylene glycol monostearate, propylene glycol dicaprylate, propylene glycol dicaprate diacetate glycol, dilaurate glycol, dipalmite glycol, diformate glycol, dibutyrate glycol dibenzorate glycol dipalmate glycol, dipropionate glycol, monoacetate glycol monopalmitate glycol and monoformate glycol. Diethylene glycol monostearate is also an ester derivative.

Examples of polyglycol (polydiol) derivatives which are esters are polyethylene glycol (PEG) 200-6000 mono and dilaurates, such as, PEG 600 dilaurate, PEG 600 monolaurate, PEG 1000 dilaurate, PEG 1000 monolaurate, PEG 1540 dilaurate and PEG 1540 monolaurate, polyethylene glycol 200-6000 mono and dioleates, such as, PEG 400 monoleate, PEG 600 dioleate, PEG 600 menooleate, PEG 1000 monoleate, PEG 1540 dioleate, PEG 1540 monooleate and polyethylene glycol 200-6000 mono and distearates, such as, PEG 400 distearate, PEG 400 monostearate, PEG 600 distearate, PEG 600 monostearate, PEG 1000 distearate, PEG 1000 monostearate, PEG 1540 distearate, PEG 1540 monostearate and PEG 3000 monostearate.

Glycerol (glycerine) is a triol glycerol. Examples of glycerol esters are glycerol monostearate, glycerol distearate, glycerol monooleate, glycerol monolaurate, glycerol dilaurate, glycerol dipalmitate, glycerol monopalmitate, glycerol triacetate, glycerol tribenzoate, glycerol tributyrate, glycerol trimyristate, glycerol trioleate, glycerol trilaurate, glycerol, tripalmitate and glycerol tristearate.

The content of the additional solvent in compositions which contain the same is the remainder of mixture with the composition of NBPT and at least one alkylene glycol alkyl ether. Thus in one group of embodiments, the content of the additional solvent can be between about 99 percent by weight and about 5 percent by weight, or between about 70 percent by weight and about 10 percent by weight together with the combination of the N-(alkyl) thiophosphoric triamide in the same concentration ranges described for composition with the alkylene glycol alkyl ether as the sole solvent. In other embodiments, the mixed content of the composition of the invention is between about 99 percent by weight and about 50 percent by weight, and preferably between about 70 percent by weight and about 50 percent by weight, based upon the only other component of the formulation being the N-alkyl thiophosphoric triamide urease inhibitor.

The solvents according to the present invention have properties that are advantageous for their use in agriculture such as: (1) improved stability of the active ingredient urease inhibitor, such as N-(n-butyl) thiophosphoric triamide (NBPT); (2) excellent solubility characteristics; (3) extremely low flammability and flammability of the solvents; (4) reduced toxicity and/or health risk relative to the use of NMP and/or PVP which greatly simplifies the handling and/or storage of the solution; (5) resistance to solidifying under cold temperatures without the use of additional crystallisation inhibitors; and (6) good adsorption characteristics onto other solid components such as UFP or urea for solid fertilizer compositions and excellent miscibility with liquid urea containing fertilizer formulations, which may contain water. Another advantage is their low cost.

Other Optional Components

Other optional components may be used in compositions of the present invention. Examples of other agents, include but are not limited to a nitrification inhibitor, a conditioner, xanthan gum, calcium carbonate (agricultural lime) in its various forms for adding weight and/or raising the pH of acidic soils; metal containing compounds and minerals such as gypsum, metal silicates and chelates of various micronutrient metals such as iron, zinc and manganese; talc; elemental sulfur; activated carbon, which may act as a "safener" to protect against potentially harmful chemicals in the soil; a plant protectant; a nutrient stabilizer, super absorbent polymers, wicking agents, wetting agents, plant stimulants to accelerate growth, an inorganic nitrogen, phosphorus, potassium (N—P—K) type fertilizer, sources of phosphorus, sources of potassium, and organic fertilizers, surfactants, such as alkylaryl polyether alcohols; initiators, stabilizers, cross linkers, antioxidants, UV stabilizers, reducing agents, dyes, such as blue dye (FD & C blue #1); and plasticizers. Examples of conditioners include but are not limited to tricalcium phosphate, sodium bicarbonate, sodium ferricyanide, potassium ferricyanide, bone phosphate, sodium silicate, silicon dioxide, calcium silicate, talcum powder, bentonite, calcium aluminum silicate, stearic acid, and polyacrylate powder. Examples of plant protectants and nutrient stabilizers include silicon dioxide, and the like.

Nitrification inhibitors are compounds which inhibit the conversion of ammonium to nitrate and reduce nitrogen losses in the soil. Examples of nitrification inhibitors include, but are not limited to, dicyandiamide (DCD), and the like. The DCD of the present invention can have a particle size in the range from about 50 to 350 μm.

The content of the additional components can be from about 1 to about 99 percent by weight of the composition. For example, the amount of the additional components in the composition can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or about 99% by weight of the total granular fertilizer composition. If DCD is present it may be in the range of about 40 to 95. The ratio of NBPT to DCD should exceed a value of about 0.02, in some embodiments is between about 0.02 and about 10.0, and in some embodiments is between about 0.04 and about 4.0.

The utilization of both a urease inhibitor and a nitrification inhibitor, in the fertilizer composition of this invention offers an opportunity to tailor the make-up of the composition to match the nitrogen nutrient demand of a given crop/soil/weather scenario. For example, if the soil is characterized by a low pH and/or if rain is anticipated shortly after fertilizer application and the opportunity for ammonia losses through volatilization to the atmosphere is thereby diminished, the level of the NBPT urease inhibitor incorporated into the formulation may be reduced, within the specified range, without also changing the level of the DCD nitrification inhibitor. The relative resistance of the fluid fertilizer composition of this invention to urea hydrolysis and ammonia oxidation is controlled by properly selecting the NBPT to DCD weight ratio of the composition. This ratio should exceed a value of about 0.01, or between about 0.02 and about 8.0, or be between about 0.05 and about 1.0. Fluid fertilizer compositions with NBPT to DCD weight ratios near the higher end of these ranges will exhibit relatively higher resistance to urea hydrolysis than to ammonium oxidation, and vice versa.

Compositions with UFP

Another object of the present invention is the use of the liquid composition containing the phosphoric or thiophosphoric triamide derivative in compositions that can be used in urea-containing fertilizers. In some applications, a UFP has been used as a carrier for NBPT (see e.g. U.S. Patent Publication 2007/0157689). Accordingly, in another group of embodiments, the solutions of the present invention are suitable for deposited the NBPT into the UFP.

The solid UFP of the present invention can be any form of UFP. Examples of solid UFP include PERGOPAK M® 2, available from Albemarle Corporation and NITAMIN 368, available from Koch Agronomic Services, LLC. The solid UFP is present in the composition in the range of about 3 to 80%.

The means by which the NBPT and alkylene glycol alkyl ether composition is deposited onto the UFP can be selected from any method known. In one group of embodiments, the one or more active agents are deposited onto the UFP by using a drying device such as a high shear mixer, ribbon, drier, blade, drier, or other similar device. In one group of embodiments, the drying device is a ribbon drier or blade drier.

Typically, one or more active agents are coated onto the UFP by introducing into the drying device the UFP and a solution comprising NBPT and glycol alkyl ether.

The amount of UFP used may vary and will usually depend on the particular application, as well as the optional presence of other components besides the UFP used in the present invention. The solution comprising NBPT and alkylene glycol alkyl ether typically contains from about 20 to 60 wt. % of the NBPT, based on the weight of the solution, of the one or more active agent(s). In one group of embodiments, the solution comprises from about 25 to 50 wt. %, based on the total weight of the composition. In one group of embodiments, the solution comprises from about 30 to about 35 wt. % of the active agent based, on the total weight of the composition. In a further embodiment of the invention, the composition contains from about 1 to 55% UFP and from about 99.0 to 70.0% DCD. Without DCD, the composition may contain about 1 to 80% NBPT and about 99 to 20% UFP.

In the practice of this embodiment of the present invention, the UFP and the NBPT and alkylene glycol alkyl ether solution can be introduced into the drying device simultaneously, in stages, either the UFP or the NBPT and alkylene glycol alkyl ether solution can be introduced before the other, or any combinations thereof. Thus, this embodiment of the present invention can be either a batch or continuous process. In one group of embodiments, the NBPT and alkylene glycol alkyl ether solution is introduced into the drying device after the UFP. In this and other embodiments, the introduction of the active agent solution is controlled to avoid over-wetting of the UFP. Over-wetting can be prevented by introducing the active agent solution into the drying device at a rate substantially equal to the rate at which the solvent volatilizes. The volatilization of the solvent is achieved by operating the drying device under conditions that include a temperature that is below the melting point of the active agent(s) and below the boiling point of the solvent. In one group of embodiments, the drying device is operated under such a temperature and a sub-atmospheric pressure. In one group of embodiments, the temperatures under which the drying device is operated are in the range of from about 20° C. to about 200° C., or in the range of from about 20° C. to about 100° C., or from about 20° C. to about 50° C. Also, as stated above, the drying device may be operated under sub-atmospheric pressures, i.e. under a vacuum. These pressures may be in the range of from about 760 mmHg to about 0.1 mmHg, or in the range of from about 500 mmHg to about 50 mmHg, or from about 100 mmHg to about 50 mmHg.

Fertilizer Compositions

The resulting solid is then blended directly with granulated urea or be used as an additive to liquid urea.

Solid Urea-Based Fertilizer Compositions

Urea Fertilizer Base

The urea-based granular fertilizer of the present invention can include any suitable quantity of a urea source and contains one or more additional components. In one group of embodiments, the urea source is granulated solid or prilled urea. One of skill in the art will appreciate other urea sources for the inventive methods. The amount of the urea source in the urea-based granular fertilizer can range from about 1% to about 99% by weight of the total granular fertilizer composition. The amount of the urea source in the urea-based granular fertilizer can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or about 99% or more by weight of the total granular fertilizer composition In another group of embodiments, the present invention provides a urea-based granular fertilizer composition comprising:
a) a urea source of from about 95% to 99.075% by weight of the total granular fertilizer composition;
b) a composition of NBPT and alkylene glycol alkyl ether and UFP as described above in the range of from about .025% to 5% by weight of the total granular fertilizer composition.

Thus in one embodiment, the urea content of the composition of this invention is between about 90% and about 99% by weight, and alternatively between about 92% and about 99% by weight. The content of the NBPT and UFP composition is between about 0.02% and about 0.5% by weight, or between about 0.04% and about 0.4% by weight. DCD may account for about 0.01% to about 1.2% by weight of the composition, and in some embodiment's accounts for between about 0.05% and about 1.1% by weight of the composition. The composition may also contain some moisture, urea synthesis byproducts, and an alkylene glycol alkyl ether, and as noted above may optionally contain other additives, such as a dye, an NBPT stabilizer, or a micronutrient. The diameter of the granules of the improved homogenous urea-based fertilizer composition of this invention ranges from about 0.5 millimeters to about 10 millimeters, and in some embodiments from about 0.8 millimeters to about 0.9, to about 1.0, to about 1.1, to about 1.2, to about 1.3, to about 1.4, to about 1.5, to about 1.6, to about 1.7, to about 1.8, to about 1.9, to about 2.0, to about 2.1, to about 2.2, to about 2.3, to about 2.4, to about 2.5, to about 2.6, to about 2.7, to about 2.8, to about 2.9, to about 3.0, to about 3.1, to about 3.2, to about 3.3, to about 3.4, to about 3.5, to about 3.6, to about 3.7, to about 3.8, to about 3.9, to about 4.0, to about 4.1, to about 4.2, to about 4.3, to about 4.4, to about 4.5, to about 4.6, to about 4.7, and to about 4.8 millimeters.

Processes for Making Solid Urea-Based Fertilizer Compositions

In one aspect, the present invention provides a method, wherein the NBPT composition is blended or mixed with the urea. The conditioner when mixed or blended with a urea-based fertilizer provides a urea-based fertilizer that has improved storage and handling properties.

In one group of embodiments, the present invention provides a composition similar to wherein commercial fertilizers, including, but not limited to SUPER U®; UFLEXX®; UMAXX®; or granular urea treated with AGROTAIN DRY®.

In one group of embodiments, the NBPT and UFP composition can be incorporated into the homogenous urea-based fertilizer composition by blending, either dry or as a concentrated solution of NBPT and UFP in an alkylene glycol ether solvent on urea. The incorporation can be done at ambient conditions or on molten urea at a temperature of about 266° F. to about 275° F. prior to the granulation or prilling of the urea in a conventional urea production facility. Sufficient mixing is employed during this blending step to assure that the NBPT, UFP and alkylene glycol ether solution is homogeneously distributed, especially before the melt cools and solidifies in the subsequent granulation step if molten urea is used.

The NBPT, UFP and alkylene glycol ether solution of this invention remains stable over extended periods of time and over temperatures ranging from about 30° F. to about 120° F. Thus, both the solid and liquid forms of the NBPT and UFP composition of this invention can be managed using conventional storage, transportation, and pumping equipment.

The amount of NBPT and UFP compositions of the present invention added to urea in accordance with this invention in either solid or liquid form depends on the desired NBPT content of the granular fertilizer composition and can be readily calculated by those skilled in the art. In some embodiments, no, or only very limited quantities of alkylene glycol alkyl ether are introduced into the urea along with the NBPT and UFP. For example, if the NBPT and UFP content of the NBPT, UFP and glycol ether solution used to incorporate the NBPT and UFP in the fertilizer composition is 70% and the NBPT content of the resulting fertilizer composition is 0.07%.

In some embodiments, DCD can also be added to and blended with the urea at this point in the formulation rather than during the formulation with the UFP. Several methods can be used for the introduction of DCD into solid or molten urea: if available as a powder or in granular form, the DCD can be fed into a stream of solid or molten urea using a conventional solids feeding device; or, the DCD may be dissolved in a relatively small quantity of molten urea, as for example in a side stream of molten urea in a urea plant, to form a concentrated DCD solution in molten urea which is then metered into the main stream of the solid or molten urea. Finally, the DCD may be incorporated into the NBPT, UFP and alkylene glycol ether solution described hereinabove and introduced into the urea or molten urea along with the NBPT, UFP and alkylene glycol ether solution. Regardless of the method selected to introduce the DCD into the urea, sufficient mixing should be provided to facilitate homogenous distribution of the DCD throughout the urea. The homogeneous distribution of the NBPT, the UFP and DCD in the granular fertilizer compositions of this invention enhances the performance of these compositions in terms of their ability to promote plant growth.

The order in which the NBPT and UFP composition and the DCD are added to the urea in the practice of this invention is flexible: either the NBPT and UFP composition or DCD may be introduced first, or both of these components may be added simultaneously. In one group of embodiments, the DCD is added first to provide adequate time for both the dissolution and uniform distribution of the DCD in the molten urea prior to the granulation step. A convenient point for the addition of DCD to urea in a urea production plant is before or between any evaporation steps used to reduce the water content of the urea. The NBPT and UFP composition, however, may be introduced into the molten urea just prior to the granulation or prilling step with only sufficient retention time in the melt to allow for uniform distribution of the NBPT in the melt. In one group of embodiments, the retention time of the melt between the point of the NBPT and UFP composition addition and the granulation step is less than 5 minutes, or less than 1 minute.

After the NBPT and UFP composition is combined with the urea, the granules may be sized. In one group of embodiments, granules which pass through a 4 mesh Tyler Series sieve (about 4.76 millimeters) and stay on a 20 mesh Tyler Series sieve (about 0.84 millimeters) are retained as product. The undersized particles may be recycled and the oversized particles may be ground and/or recycled.

Liquid Urea-Based Compositions

The present invention also provides an improved fluid urea-ammonium nitrate (UAN) fertilizer composition containing the NBPT and UFP composition. Specifically, the improved fluid fertilizer composition of this invention is comprised primarily of an aqueous solution of urea, ammonium nitrate, the NBPT and UFP composition, and optionally dicyandiamide (DCD).

The urea content of the composition of this invention is between about 24% and about 32% by weight, or between about 26% and about 32% by weight; the ammonium nitrate content of the composition is between about 34% and about 42% by weight, or between about 36% and about 42% by weight; the NBPT content of the composition is between about 0.01% and about 0.4% by weight, or between about 0.02% and about 0.3% by weight; and the DCD accounts for about 0% to about 2.0% by weight of the composition, and may account for between about 0.03% and about 1.5% by weight of the composition. The balance of the composition consists primarily of water. An alkylene glycol alkyl ether solvent for the NBPT as disclosed above, may also be present in small quantities.

Processes for Making Liquid Urea-Based Compositions

In accordance with the present invention, the NBPT and UFP composition may be incorporated into the fluid fertilizer composition by adding a solid or liquid form of the NBPT and UFP composition directly to a UAN fluid with sufficient mixing to assure that the NBPT is homogeneously distributed throughout the fluid fertilizer composition. Both the solid and liquid forms of the NBPT composition as disclosed above can be introduced into UAN using conventional metering devices.

The amount of the NBPT and UFP composition in accordance with this invention depends on the desired NBPT content of the fertilizer composition within the ranges specified hereinabove and on the NBPT, UFP and alkylene glycol ether solution, and can be readily calculated by those skilled in the art.

Like the solid formulation, DCD can also be added to the UAN fluid at this stage, rather than with the UFP, alone. Several methods are available for the introduction of DCD into UAN. If available as a powder or in granular form, the DCD can be fed into UAN fluid using a conventional solids feeding device. In one group of embodiments, however, the DCD is first incorporated into a relatively small quantity of UAN fluid so as to form a slurry of DCD in UAN fluid; this slurry is then blended with the balance of the UAN fluid in the amount needed to provide the desired concentration of DCD within the ranges specified hereinabove. Regardless of the method selected, to introduce the DCD into the UAN fluid, sufficient mixing should be provided to facilitate homogenous distribution of the DCD throughout the UAN fluid. The homogeneous distribution of both the NBPT composition and DCD in the fluid fertilizer compositions of this invention enhances the performance of these compositions in terms of their ability to promote plant growth.

The order in which the NBPT composition and DCD are added to the fluid fertilizer in the practice of this invention is flexible: either the NBPT composition or DCD may be introduced first, or both of these components may be added simultaneously. However, in light of the relative instability of NBPT in aqueous solutions, solid or liquid forms of the NBPT composition may be introduced into the fluid fertilizer relatively late in production-storage-distribution sequence of the fluid fertilizer, so as to minimize the time span between the addition of the NBPT composition to the fluid fertilizer and the application of the fertilizer to the soil.

The NBPT composition is added to the UAN solution in the range of about 0.01 to 5.0% additive in the final product. In one group of embodiments, the NBPT composition is added in the range of about 0.4 to 2.5% to fluid UAN or urea solution, or blends thereof, to form a fluid fertilizer. The fluid urea-based fertilizer of the present invention contains from about 0.004 to 1.50% NBPT, from about 0 to 0.850% DCD, and from about 99.9 to 98.0% aqueous UAN. Optionally, the fertilizer can contain up to about 0.03% silicon dioxide. The aqueous UAN contains urea and ammonium nitrate in concentration ranges of about 15 to 50%. In one group of embodiments, the range is from about 25 to 40%.

Use

The granular fertilizer composition of this invention made by the methods described herein can be used in all agricultural applications in which granular fertilizer compositions are currently used. These applications include a very wide range of crop and turf species, tillage systems, and fertilizer placement methods. The fertilizer granules made with the NBPT with or without UFP of the present invention are useful for fertilizing a wide variety of seeds and plants, including seeds used to grow crops for human consumption, for silage, or for other agricultural uses. Indeed, virtually any seed or plant can be treated in accordance with the present invention using the compositions of the present invention, such as cereals, vegetables, ornamentals, conifers, coffee, turf grasses, forages and fruits, including citrus. Plants that can be treated include grains such as barley, oats and corn, sunflower, sugar beets, rape, safflower, flax, canary grass, tomatoes, cotton seed, peanuts, soybean, wheat, rice, alfalfa, sorghum, bean, sugar cane, broccoli, cabbage and carrot.

The granular urea-based fertilizer composition of this invention can be used in all agricultural applications in which granular urea is currently used. These applications include a very wide range of crop and turf species, tillage systems, and fertilizer placement methods. Most notably, the fertilizer composition of this invention can be applied, to a field crop, such as corn or wheat, in a single surface application and will nevertheless supply sufficient nitrogen to the plants throughout their growth and maturing cycles.

The rate at which the fertilizer composition of this invention is applied to the soil may be identical to the rate at which urea is currently used for a given application. Alternately, the composition of this invention may be applied to the soil at lower rates than is the case for urea. It is of interest to illustrate the quantities of NBPT and DCD introduced into the soil when a given composition of this invention is applied as a fertilizer. For example, assuming that the composition is applied to the soil at a rate of 100 pounds per acre and that it contains 0.1% NBPT and 1% DCD, it can be readily calculated that the rates of NBPT and DCD application are 0.1 and 1.0 pounds per acre, respectively.

The UAN-based fertilizer composition of this invention can be used in all agricultural applications in which UAN is currently used. These applications include a very wide range of crop and turf species, tillage systems, and fertilizer placement methods. The new improved composition increases the nitrogen uptake by plants, enhances crop yields, and minimizes the loss of both ammonium nitrogen and nitrate nitrogen from the soil.

The rate at which the fertilizer composition of this invention is applied to the soil may be identical to the rate at which UAN is currently used for a given application. Alternately, the composition of this invention may be applied to the soil at lower rates than is the case for UAN. It is of interest to illustrate the quantities of NBPT and DCD introduced into the soil when a given composition of this invention is applied as a fertilizer. For example, assuming that the composition is applied to the soil at a rate of 200 pounds per acre and that it contains 0.05% NBPT and 0.5% DCD, it can be readily calculated that the rates of NBPT and DCD application are 0.1 and 1.0 pounds per acre, respectively.

The following examples are intended to illustrate, but not to limit, the methods and compositions of the invention. All percentages described herein are by weight, unless otherwise indicated.

EXAMPLES

The following describes examples of compositions of NBPT of the present invention. The compositions are prepared by dissolving at least 25 wt. % of NBPT in the following solvents with stirring to form clear solutions.

Example 1

A concentrated solution of N-(n-butyl) thiophosphoric triamide (NBPT) was prepared according to the following: Molten commercial NBPT (20 g, ~84% NBPT) was added to Flomin F660 (30 g) and the resulting liquid was shaken for 30 seconds and allowed to cool to rt. The NBPT concentration of this solution was approximately 35%.

Example 2

To the NBPT solution from Example 1 (25 g) was added propylene glycol (6.1 g) to give a final NBPT concentration of 26.7% and a green dye (0.074 g) and the mixture was stirred at rt until complete dissolution of the dye (~10 min).

Example 3

Molten commercial NBPT (16 g, ~84% NBPT) was added to warmed (40° C.) Flomin F660 (34 g) and the resulting liquid was shaken for 30 seconds and allowed to cool to rt. The NBPT concentration of this solution was approximately 26.7%.

Example 4

To the NBPT solution of Example 3 (12.5 g) was added green dye (0.037 g) and the resulting mixture was stirred at rt for 30 min.

Example 5

A concentrated solution of N-(n-butyl) thiophosphoric triamide (NBPT) was prepared according to the following: Molten commercial NBPT (16.7 g, >97% NBPT) was added to Flomin F660 (33.3 g) and the resulting liquid was shaken for 30 seconds and allowed to cool to rt. The NBPT concentration of this solution was approximately 33.4%.

Example 6

Molten commercial NBPT (13.4 g, ~0.97% NBPT) was added to warmed (40° C.) Flomin F660 (36.6 g) and the resulting liquid was shaken for 30 seconds and allowed to cool to rt. The NBPT concentration of this solution was approximately 26.7%.

Urea Coating

Example 7

To 100 g of urea was added 0.34 g of the NBPT solution from Example 2 in a sealable cup. The lid was securely fastened and the mixture was shaken for 1 min. The resulting urea was uniformly coated with the NBPT as indicated by the uniformity of the green dye covering the urea. The NBPT concentration on the urea was determined to be 930 ppm.

Example 8

To 100 g of urea was added 0.34 g of the NBPT solution from Example 4 in a sealable cup. The lid was securely fastened and the mixture was shaken for 1 min. The resulting urea was uniformly coated with the NBPT as indicated by the uniformity of the green dye covering the urea. The NBPT concentration on the urea was determined to be 910 ppm.

Example 9

The stability and the capability of the solutions of N-(n-butyl) thiophosphoric triamide (NBPT) in the solvent systems of the present invention to remain liquid at low temperatures (flowability) is assessed. A 26.7 wt. % solution of NBPT in the binary solution of Example 3 is stored for 3 months at 0° C. and the presence of crystals in the solutions and the flowability of the solutions is assessed.

For comparison with the prior art, a mixture containing propylene glycol (PG) with 10 wt. % N-methylpyrrolidone (NMP) described in the U.S. Pat. No. 5,698,003 and a mixture containing 90 wt. % dipropylene glycol monomethyl ether with 10wt. % N-methylpyrrolidone (NMP) described in WO 2008/000190 was used. The following observations were made: The mixture of U.S. Pat. No. 5,698,003crystallized under said conditions. While the mixture of the present invention and of WO 2008/000196 did not crystalize under said conditions, the binary solution of the present contained no polyvinylpyrrolidone or NMP, surprisingly showing that the addition of crystallization inhibitors is not necessary. Other binary and ternary solvent systems of the present invention have similar properties. All solvent systems of the present invention are water-miscible.

Example 10

A highly stable solution of N-(n-butyl)thiophosphoric triamide (NBPT) is a key feature for its use and long-term storage of its solutions. The presence of water causes the decomposition of NBPT into non-effective substances during a longer storage and is the main cause of the NBPT degradation during a long-term storage.

The solvent systems of the present invention show a stabilizing effect towards NBPT. All solvents used in this example are commercially available in a very good quality, having the water content lower than 0.1 wt. %. Nevertheless, to confirm the stabilization effect of the solvents, the water content was artificially increased to 1 wt. %. The thus adjusted solvent systems simulate the effect of the moisture on NBPT (higher contents of the moisture than 1 wt. % are uncommon).

In order to verify the long-term stability of NBPT, the following solvents containing less than 0.1wt. % of water were tested. 26.7wt. % solutions of NBPT were stored at room temperature at daylight in glass, well-sealed vials. The monitoring of any degradation NBPT was carried out by reverse-phase HPLC with UV detection in the mobile phase containing 25 vol. % acetonitrile and 75 vol. % 0.005M ammonium acetate. The chromatogram was evaluated at the wavelength of 193 nm. The mobile phase flow was 1 ml/min, the column temperature was 40° C. The injected volume was 5 µl. The evaluation was carried out by the method of external standard with the calibration using a calibration line. RSD is the relative deviation in rel. %, calculated from three repeats of sampling and two repeats of analysis of each sample (see EP 15688).

The solvent systems of the present invention have a stabilizing effect towards NBPT. After 12 weeks of storage at room temperature, no significant decrease of the content of the active component NBPT occurs in any sample (the method used can determine the change of approx. at least 1 wt. %).

Example 11

Granular Urea Formulation with Formulation of Example 1

As a first step, a 100,000 lb. batch of NBPT solution of Example 1 was pumped at a rate equivalent to 4 pounds of NBPT per 1996 pounds of urea into a 34 ton/hour stream of molten urea passing through a pipe leading from the last stage of urea evaporation directly to the urea granulation apparatus in a urea production facility. The temperature of the molten urea at the point at which the NBPT solution was injected was about 275° F. Although the retention time of the urea stream between the point at which the concentrated NBPT solution was injected and the urea granulation apparatus was only in the order of 20 seconds, the degree of turbulence in the stream of molten urea assured thorough mixing and homogenous distribution of the concentrated NBPT solution in the molten urea. The urea production facility was operated in this mode for a period of about 8.5 days, during which time about 6960 tons of urea containing 0.2% NBPT was produced. The fertilizer was tested for the uniformity of distribution of NBPT. The NBPT was uniformly distributed through each granule of the product.

Example 12

Liquid Urea Formulation with Liquid Formulation of NBPT

This example illustrates the method of this invention for the incorporation of the NBPT composition into a fluid urea-containing fertilizer composition. The formulation of Example 1 was added at a rate equivalent to 2 pounds of NBPT per 1998 pounds of UAN solution into a 50 ton/hour stream of UAN solution containing 30% urea and 40% ammonium nitrate and approximately 10 pounds per ton DCD. Said stream of UAN solution was being transferred from a liquid storage tank into liquid rail cars. Although the retention time of the UAN solution between the point near the liquid storage tank at which the concentrated NBPT solution was injected into the UAN solution and the point at which the solution was discharged into the rail car was only in the order of 40 seconds, the degree of turbulence in the stream of UAN solution assured thorough mixing and homogenous distribution of the concentrated NBPT solution in the UAN solution. A set of rail cars was filled in this manner with a total of about 1400 tons of UAN solution containing about 0.1% NBPT.

Example 13

Granular Urea Formation with Example 1

This example illustrates the method of this invention for the incorporation of the NBPT composition into a granular urea-containing fertilizer composition. The test was conducted in an industrial facility with a urea production rate of 34 tons per hour. DCD was introduced into the molten urea at a rate of 20 pounds of DCD per 1976pounds of urea before the last stage of evaporation, that is at a point in the continuous urea scheme where the molten urea has a moisture content of about 4-6%. Thorough mixing was provided to assure homogeneous distribution of the DCD in the urea melt. The DCD-containing molten urea was then passes through the last evaporator to reduce its moisture content to about 1%. A concentrated NBPT solution of Example 1 was pumped into the DCD-containing molten urea stream at a rate equivalent to 4 pounds NBPT per 1996 pounds of DCD-containing molten urea. The temperature of the molten urea at the point at which the NBPT solution was injected was about 275° F. The resulting stream of NBPT- and DCD-containing molten urea was next directed through a pipe leading directly to the granulation apparatus in a urea production facility. Although the retention time of the NBPT- and DCD-containing molten urea stream between the point at which the concentrated NBPT solution was injected and the urea granulation apparatus was only in the order of 20 seconds, the degree of turbulence in the stream of molten urea composition assured thorough mixing and homogenous distribution of the concentrated NBPT solution in the DCD-containing molten urea.

The solutions of N-(alkyl) phosphoric or thiophosphoric triamides in the solvent systems of the present invention can be long-term stored, used for the impregnation of solid urea-containing fertilizers, such as granular urea, added into the mixture for the manufacture of solid urea-containing fertilizers or added into liquid urea-containing fertilizers. They can also be used as a suitable urease inhibitor formulation for addition into animal wastes or sprays masking urine odor.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A composition comprising a solution of:
   a urease inhibitor in an amount of between 1 wt. % and about 80 wt. %;
   an alkylene glycol alkyl ether selected from the group consisting of diethylene glycol monobutyl ether, dipropylene glycol dimethyl ether, triethylene glycol monobutyl ether, tripropylene glycol monomethyl ether, and tetraethylene glycol monobutyl ether; and
   a cosolvent selected from the group consisting of a glycol, glycol ester, polyglycol, polyglycol ester, glycerol, and glycerol ester.

2. The composition of claim 1 wherein at least one alkylene glycol alkyl ether is triethylene glycol monobutyl ether.

3. The composition of claim 1 wherein the alkylene glycol alkyl ether is a mixture of triethylene glycol monobutyl ether, tetraethylene glycol monobutyl ether, and diethylene glycol monobutyl ether.

4. The composition of claim 1 wherein the cosolvent is present in an amount of about 70 percent by weight to about 10 percent by weight.

5. The composition of claim 1 wherein the cosolvent comprises propylene glycol.

6. The composition of claim 1 wherein the urease inhibitor is a phosphoric or thiophosphoric triamide of the general formula (II), $$X=P(NH_2)_2NR^1R^2 \qquad (II)$$

where X=oxygen or sulfur, and $R^1$ and $R^2$ are independently selected from hydrogen, $C_1$-$C_{12}$ alkyl, $C_3$-$C_{12}$ cycloalkyl, $C_6$-$C_{14}$ aryl, $C_2$-$C_{12}$ alkenyl, $C_2$-$C_{12}$ alkynyl, $C_5$-$C_{14}$ heteroaryl, $C_1$-$C_{14}$ heteroalkyl, $C_2$-$C_{14}$ heteroalkenyl, $C_2$-$C_{14}$ heteroalkynyl, or $C_3$-$C_{12}$ cycloheteroalkyl.

7. The composition of claim 1 wherein the urease inhibitor is N-(n-butyl) thiophosphoric triamide (NBPT).

8. The composition of claim 1 further comprising one or more components selected from the group consisting of a conditioner, a dye, and xanthan gum.

9. A composition comprising
   a urea formaldehyde polymer and
   the composition of claim 1.

10. A composition comprising
    urea and
    the composition of claim 1.

11. A composition comprising
    a) urea
    b) a nitrification inhibitor and
    c) the composition of claim 1.

12. The composition of claim 10 where the urease inhibitor is a phosphoric triamide or thiophosphoric triamide.

13. The composition of claim 12 where the urease inhibitor is N-(n-butyl) thiophosphoric triamide (NBPT).

14. The composition of claim 11 where the nitrification inhibitor is dicyandiamide (DCD).

15. A method of making a fertilizer, the method comprising the step: using the composition of claim 1 to manufacture the fertilizer.

16. The composition of claim 1 made by contacting the urease inhibitor with the alkylene glycol alkyl ether.

17. The composition of claim 9 made by contacting a urea-formaldehyde polymer with a composition of claim 1.

18. The composition of claim 11 made by contacting urea with a composition of claim 1 and a nitrification inhibitor.

19. The composition of claim 1, comprising at least two different alkylene glycol alkyl ethers selected from said group.

20. The composition of claim 1, wherein the urease inhibitor is N-(n-butyl) thiophosphoric triamide (NBPT) and the alkyene glycol ether is triethyleneglycol monobutyl ether.

21. The composition of claim 20, further comprising an alkylene glycol ether selected from the group consisting of diethyleneglycol monobutyl ether, triethylene glycol and tetraethyleneglycol monobutyl ether.

22. The composition of claim 20, wherein the cosolvent comprises propylene glycol.

23. The composition of claim 20, further comprising a dye.

24. The composition of claim 20, comprising about 20 to 60 wt. % NBPT based on the total weight of the composition.

25. The composition of claim 20, comprising about 25 to 50 wt. % alkylene glycol alkyl ether based on the total weight of the composition.

26. The composition of claim 25, wherein the amount of triethylene glycol monobutyl ether is about 70 to 80 wt. % based on the total weight of the alkylene glycol alkyl ether.

27. The composition of claim 25, wherein the amount of tetraethylene glycol monobutyl ether is about 15 to 20 wt. % based on the total weight of the alkylene glycol alkyl ether.

28. The composition of claim 25 wherein the amount of diethylene glycol monobutyl ether is less than about 5 wt. % based on the total weight of the alkylene glycol alkyl ether.

29. The composition of claim 1, wherein:
the urease inhibitor is N-(n-butyl) thiophosphoric triamide (NBPT);
the alkyene glycol alkyl ether is triethyleneglycol monobutyl ether; and
the cosolvent is propylene glycol;
wherein the composition further comprises N-methyl-2-pyrrolidone (NMP) and a dye.

30. The composition of claim 29, wherein:
the NBPT is present in an amount of about 20 to 70 wt. %;
the propylene glycol is present in an amount of about 70 percent by weight to about 10 percent by weight;
and the NMP is present in an amount of at least 10 wt. %.

31. A composition comprising a solution of:
a urease inhibitor in an amount of between 1 wt. % and about 80 wt. %;
at least one alkylene glycol alkyl ether solvent selected from the group consisting of diethylene glycol monoethyl ether, diethylene glycol monopropyl ether, diethylene glycol monopentyl ether, diethylene glycol monoisopropyl ether, diethylene glycol monoisobutyl ether, diethylene glycol monohexyl ether, triethylene glycol monomethyl ether, triethylene glycol monopropyl ether, triethylene glycol monobutyl ether, triethylene glycol monopentyl ether, triethylene glycol monoisopropyl ether, triethylene glycol monoisobutyl ether, triethylene glycol monohexyl ether, tetraethylene glycol monomethyl ether, tetraethylene glycol monoethyl ether, tetraethylene glycol monopropyl ether, tetraethylene glycol monobutyl ether, tetraethylene glycol monopentyl ether, tetraethylene glycol monoisopropyl ether, tetraethylene glycol monoisobutyl ether, tetraethylene glycol monohexyl ether, dipropylene glycol monoethyl ether, dipropylene glycol monopropyl ether, dipropylene glycol monobutyl ether, dipropylene glycol monopentyl ether, dipropylene glycol monoisopropyl ether, dipropylene glycol monoisobutyl ether, dipropylene glycol monohexyl ether, tripropylene glycol monoethyl ether, tripropylene glycol monopropyl ether, tripropylene glycol monobutyl ether, tripropylene glycol monopentyl ether, tripropylene glycol monoisopropyl ether, tripropylene glycol monoisobutyl ether, and tripropylene glycol monohexyl ether; and
a cosolvent selected from the group consisting of a glycol, glycol ester, polyglycol, polyglycol ester, glycerol, and glycerol ester.

* * * * *